United States Patent [19]

Brandenstein et al.

[11] Patent Number: 4,679,458
[45] Date of Patent: Jul. 14, 1987

[54] WORM GEAR

[75] Inventors: Manfred Brandenstein, Eussenheim; Norbert Klüpfel, Hambach; Gebhard Pape, Schweinfurt; Roland Haas, Hofheim; Rolf Schmiechen, Schweinfurt, all of Fed. Rep. of Germany

[73] Assignee: SKF GmbH, Schweinfurt, Fed. Rep. of Germany

[21] Appl. No.: 829,427

[22] Filed: Feb. 13, 1986

[30] Foreign Application Priority Data

Feb. 16, 1985 [DE] Fed. Rep. of Germany ....... 3505467

[51] Int. Cl.$^4$ .......................... F16H 1/18; F16H 55/08
[52] U.S. Cl. .................................. 74/458; 74/424.8 R
[58] Field of Search .................. 74/458, 459, 438, 427, 74/424.8 R, 457, 462, 424.8 B

[56] References Cited

U.S. PATENT DOCUMENTS

| | | | |
|---|---|---|---|
| 2,215,107 | 9/1940 | Mulka | 74/459 |
| 2,543,100 | 2/1951 | Engh | 74/424.8 R |
| 2,799,178 | 7/1957 | Schultze | 74/424.8 R |
| 3,648,535 | 3/1972 | Maroth | 74/459 |
| 4,036,110 | 7/1977 | Galonska et al. | 74/424.8 R |
| 4,106,359 | 8/1978 | Wolfe et al. | 74/424.8 R |
| 4,222,282 | 9/1980 | Taig | 74/457 |

Primary Examiner—Cornelius J. Husar
Assistant Examiner—Peter M. Cuomo
Attorney, Agent, or Firm—Rosen, Dainow & Jacobs

[57] ABSTRACT

A worm gear has a threaded spindle and a threaded nut, the thread on the spindle or the nut or on both having a profile such that the transition regions connecting the thread crown surface to the thread flanks are rounded, as is the crown surface itself. Further, the spindle thread and nut thread are intermeshed with axial and radial play such that radial forces exerted under torque loading are transmitted only by areas of the crown surface, which transmitted forces are supported by the respective areas of the opposing groove bottom. Smooth functioning is ensured even when the threaded spindle occupies a position of maximum inclination relative to the nut.

5 Claims, 5 Drawing Figures

WORM GEAR

FIELD OF THE INVENTION

The invention relates to a worm gear which is preferably used in an automatic adjustment arrangement.

BACKGROUND OF THE INVENTION

A worm gear of this type is disclosed in DE-OS No. 2030260. This worm gear is preferably used for the conversion of rotary movement into linear movement. By providing a sufficiently large thread pitch, this worm gear can also be used conversely, namely to produce rotary motion by means of linear motion. In place of the single-thread embodiment, it is possible to provide a multi-thread embodiment whereby for the same load capacity, a steeper thread pitch can be produced. The thread may, for example, have a trapezoidal profile. Thereby a relatively large-surfaced thread flank having a large load capacity is attained. Under axial loading, it is desirable that the load be distributed over practically the entire thread length, i.e. the thread of the spindle and the thread of the nut must be manufactured with extremely small tolerances. In order to avoid manufacturing all of the thread dimensions with such extreme precision, the spindle and nut in many cases are provided with a small axial play, by means of which under pure axial loading a small gap is formed between the unloaded thread flanks. Under the opposite axial loading the gap is shifted to the other thread flanks of the outer and inner threads.

In the unloaded condition or under radial loading, on the other hand, the thread flanks of the inner thread are in contact with the thread flanks of the outer thread at corresponding circumferential positions along the thread. The known worm gear is designed so that in this case in the area of the loaded thread flanks a relatively large gap still exists between the crown surface of the outer thread and the groove bottom of the inner thread. Under normal loading conditions this known worm gear works without defect. For complex load distribution, however, the case can occur where the nut takes on an inclined position or tilts relative to the spindle. This limiting case has disadvantageous consequences for the functioning of the worm gear, particularly when rotation of the spindle is to be produced from linear movement of the nut or correspondingly when rotation of the nut is to be produced from linear movement of the spindle. As a result of the inclined position, the load-carrying surfaces are reduced to a minimum such that only an infinitesimal line or even a point of contact remains between the respective radially opposite and the respective axially opposite edge areas, i.e. the crown surfaces and the thread flanks, of the outer thread of the spindle and the inner thread of the nut. In nearly all cases the inclined position effects a jamming under small deformation of the contact surfaces. In this case relative rotation between the spindle and nut is, if it occurs at all, only made more difficult. In the foregoing example of conversion from linear to rotary motion, a self-locking occurs such that movement is no longer possible. The inclined position must first be corrected in order to ensure faultless functioning.

SUMMARY OF THE INVENTION

The object of the invention is to provide a worm gear of the foregoing type wherein sufficiently smooth functioning is possible when the nut and spindle take on an inclined position relative to each other.

This object is achieved by providing a construction of both threads such that when the spindle has an inclined position relative to the nut, the contact points or areas on which the torque is exerted lie exclusively on the crown surfaces of the respective threaded regions of one thread, and such that under radial loads acting in the same direction, the two threads have a small or no axial play therebetween. Thus, the corresponding contact area of the crown surface of the one thread contacts the corresponding portion of the groove bottom of the other thread.

The torque is consequently supported by partial surfaces which advantageously are arranged substantially perpendicular to the loading direction. Therefore jamming of the worm gear is no longer possible. In order to ensure smooth functioning it is not necessary that the thread flanks be non-contacting. Although contact can occur here, the contact must be such that no force components arising from the torque occur in the area of the thread flanks. Because the worm gear of the invention also can no longer jam under torque loading, a correspondingly smooth rotation is possible even during the condition of maximum tilting of the spindle relative to the nut. As a result of this advantage, a worm gear with a relatively small thread pitch, i.e. with relatively large ratio of displacement to number of revolutions, can also be used for the conversion of linear movement to rotation and vice versa.

The worm gear in accordance with the invention can be used to advantage in automatic adjustment arrangements, where it can compensate for length differences arising from wear phenomena. This is true, for example, for brake or valve arrangements.

In accordance with a further feature of the invention, the thread has a trapezoidal profile. Therefore, the thread can be advantageously used to carry high loads. When the spindle of a worm gear of trapezoidal profile is placed in a tilted position relative to the nut, the thread crown surface between thread flanks on the spindle will come into contact with the corresponding groove bottom of the nut and the torque load will in this way be supported.

In accordance with a preferred embodiment of the invention, the transition regions between the crown surface and the two thread flanks is rounded to have a radius greater than a quarter of the thread pitch. The rounding-off of the transition region enables a smooth shifting contact of the crown surface with the groove bottom and better distribution of the torque loading. Because the transition region adjacent to the other thread flanks is likewise rounded, an easy swiveling without catching of the respective area of the thread in the thread groove is achieved. Beyond that, the rounding-off has further consequences: As the threads take on the inclined position with respect to each other, the profile of the thread on the spindle swivels in the groove of the nut so that the profile diagonal extends increasingly across the groove width. The rounding-off optimizes the disadvantageous geometric effect, whereby the axial play of the threads with respect to each other can be reduced. The rounding-off makes possible an unhindered inclination without tilting of the thread profile in the thread groove.

In accordance with a further feature of the invention, the crown surface is formed by a surface which is rounded in the axial direction or the crown surface is formed by a rounded surface which extends between the thread flanks with a radius equal to 0.2 to 0.5 times the magnitude of the thread pitch. The rounded crown surface contacts the middle area of the groove bottom of the counterpart. The inclined position of the threads with respect to each other results for this reason in the entire area under torque loading being free of edges and smooth.

In accordance with a further preferred embodiment of the invention, the crown surface and/or the shoulder areas of both threads are rounded. If the rounding of the inwardly directed thread is relatively difficult, especially for small technical specifications, the realization of the object can be further optimized by means of this further novel feature.

BRIEF DESCRIPTION OF THE DRAWINGS

The preferred embodiments of the invention are described in detail with reference to the drawings, wherein:

FIGS. 3-5 are longitudinal views of the left lower and the right upper threads of FIG. 1 for the inclined position of the threaded spindle under torque loading, wherein:

FIG. 3 shows a thread profile with rounded transition region.

FIG. 4 shows a thread profile with rounded crown surface and transition region.

FIG. 5 shows a thread profile with a rounding cropping out from the thread flank.

DETAILED DESCRIPTION OF THE PREFERRED EMBODIMENT

Figure 1:
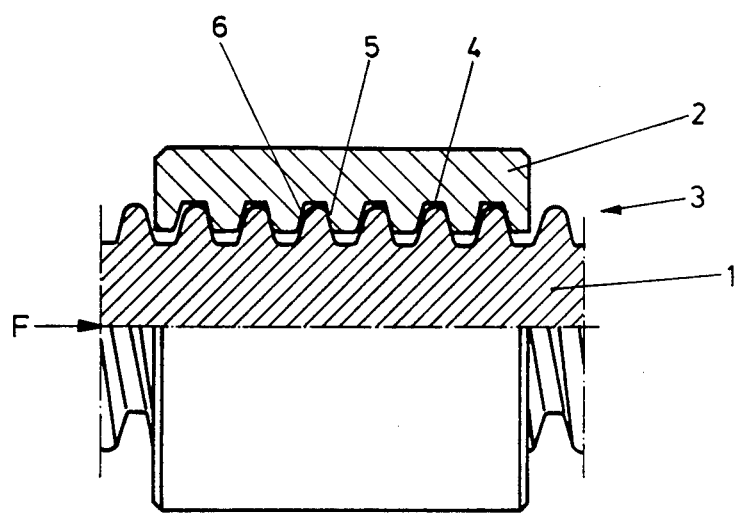
FIG. 1 is a partially sectioned, longitudinal view of the worm gear.

The worm gear shown in FIG. 1 comprises a threaded spindle 1 and a nut 2 which are coupled by means of a substantially trapezoidal thread 3. The inwardly directed thread 3 of the nut 2 and the outwardly directed thread 3 of the threaded spindle 1 cooperate to produce axial as well as a radial play. When the threaded spindle 1 opposing the nut 2 as shown in FIG. 1 is loaded with a force F, the inclined thread flanks 5 effect a centering so that at least theoretically a symmetrical gap, corresponding to the radial play, is produced over the entire circumference. Under this condition one of the thread flanks 5 runs along the entire length of the thread 3 inside the nut 2 and contacts the corresponding thread flank 5 of the threaded spindle 1. On the other thread flank 5 a gap 6 corresponding to the axial play is produced. The pitch of the thread 3 is relatively large, whereby the nut 2 experiences a torque under the axial force F on the threaded spindle 1.

Figure 2:
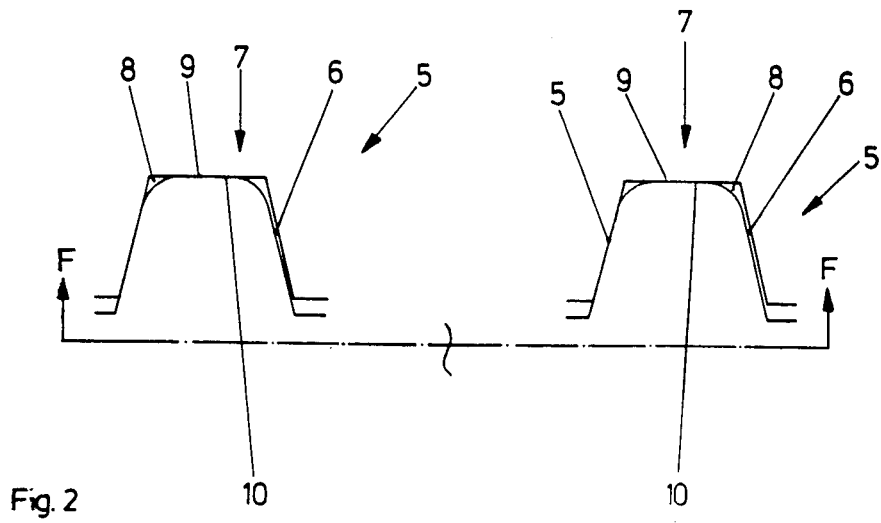
FIG. 2 is a longitudinal view of the left and right outer threads of FIG. 1 in enlarged scale under equidirectional radial loading.

The radial and axial play have a predetermined relationship to each other. This is evident in FIG. 2, which shows the upper left and upper right thread areas 7 of the threaded spindle 1 and the corresponding portions of the thread grooves 8 of nut 2 depicted in FIG. 1. Radial forces F act on the threaded spindle 1 in the same direction, whereby the spindle is radially displaced toward the nut 2 an amount equal to the radial play. As a result, the gap 4 disappears and the thread crown surface 9 abuts the groove bottom 10. The axial play in this position is not so large, so that a gap 6 between the thread flanks 5 remains. In FIG. 2 the gap 6 is shown on the right thread flank for better illustration. This position is produced by small axial loading. Likewise a gap 6 appears on the left thread flank when an oppositely directed axial load is applied.

Figure 3:
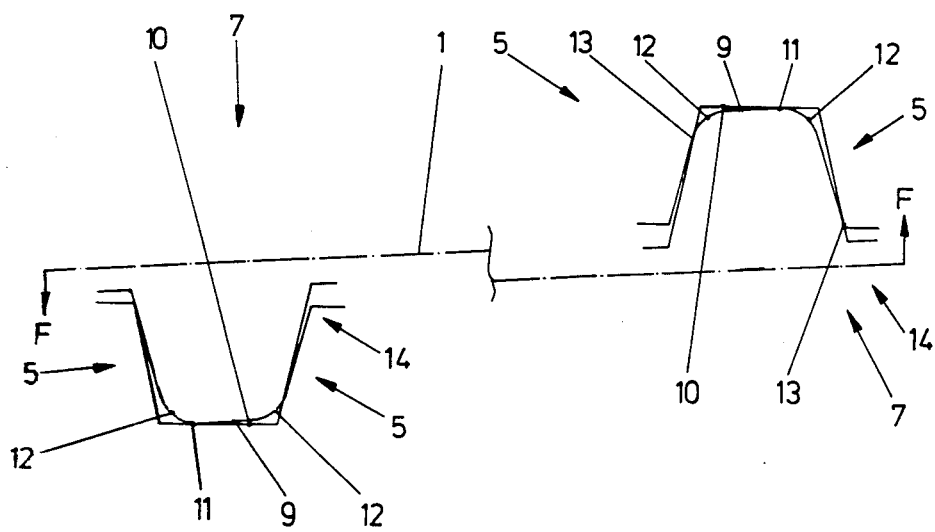
Figure 4:
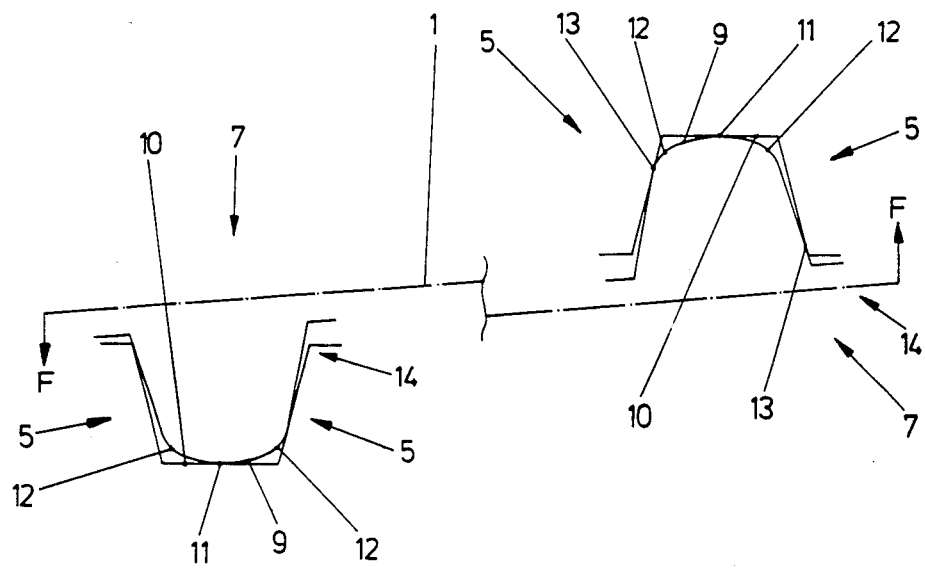
Figure 5:
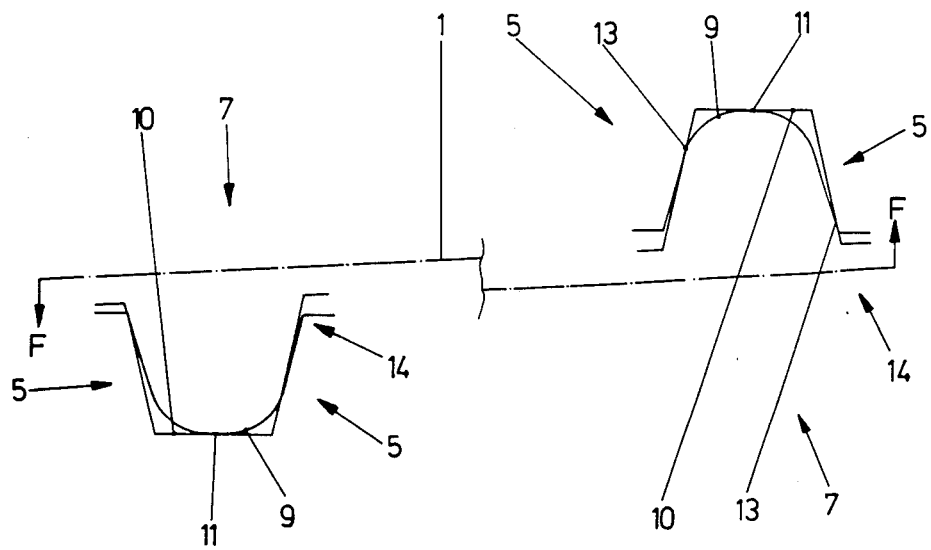

FIGS. 3-5 show two axially outer thread areas 7 of thread 3 of the worm gear of FIG. 1, wherein the upper right thread area 7 depicted is visible and the lower left thread area depicted is not visible in FIG. 1. One such arrangement of the threaded areas 7 of spindle 1 in the threaded grooves 8 of nut 2 arises when, for example, the spindle has an oblique position due to a torque applied on the spindle. This state is also produced when different radially directed forces F act on the threaded spindle 1 as shown. In this position all forces are carried exclusively by the depicted thread areas 7 of thread 3. The relatively large remaining portion of thread 3 carries no radial forces. The radial forces F must be carried on the small contact portions 11 of the threaded areas 7 depicted. Contact surfaces or linear contact portions 11 occur only with small dimensions in the case of extremely large radial forces F. Moreover, the near-surface material in an elastic area is deformed. For this reason the depicted threaded areas 7 of large dimension lead to jamming of the worm gear. In order to avoid this, the thread profile of the threaded spindle 1 diverges from a trapezoid in transition region 12 between the crown surface 9 and the thread flanks 5 and if necessary, the crown surface 9 is modified along its entire length. Furthermore, the axial play as previously described is designed so that when the radial forces F in the depicted position of greatest possible incline are supported exclusively by the crown surface 9 of the threaded spindle 1 and the groove bottom 10 of nut 2. The outer threaded areas 7 shown in the figures are depicted on an enlarged scale relative to the axial and radial distances separating them for better illustration.

In accordance with the thread profile shown in FIG. 3, the transition region 12 between the crown surface 9 and the thread flank 5 is very rounded, whereas the crown surface 9 connecting the transition regions is substantially cylindrical. The radial forces F are carried exclusively by the axially outer portions of the two portions of crown surface 9 depicted, although depending on the maximum possible radial play, the radial forces can extend into the rounded transition region 12. The radial forces F are supported by the corresponding portions of the groove bottom 10 of nut 2. The contact area 11 is punctiform in the case of small radial forces F and expands to a circle or ellipse in the case of larger loads. In this position an engagement portion 13 also arises in the area of the thread flanks 5 which carries no load, assuming dimensioning such that a corresponding axial play is provided in the non-inclined position, as shown in FIG. 2. The illustration case corresponds to maximal loading by radial forces F. Additional load-free engagement portions 13 can be produced in the shoulder area 14 of the thread 3 of nut 2, which in the conventional manner is slightly cut off, but also in accordance with the invention can be rounded.

The thread profile shown in FIG. 4 has a round crown surface 9 of larger radius than the round transition area 12. In this way the contact area 11 is shifted more toward the middle of the groove bottom 10. Furthermore, this enables a monotonous smooth sliding of the crown surface 9 on the groove bottom 10 during changing inclination of the threaded spindle.

The thread profile shown in FIG. 5 has a constant large radius extending from one thread flank 5 to the other thread flank. The detailed description of contact area 11 and engagement area 13 given in connection with FIG. 3 applies also to FIG. 5.

The foregoing description of the preferred embodiment is presented for illustrative purposes only and is not intended to limit the scope of the invention as defined in the appended claims. Modifications may be readily affected by one having ordinary skill in the art without departing from the spirit and scope of the invention concept herein disclosed. In particular, the radius of the rounded portions and the necessary axial and radial play can be adapted to the particular application. Also, the invention is not limited to rounding of the spindle thread. It is obvious that the thread of the nut, instead of the thread on the spindle, could have the novel profile shown in the drawings. Alternatively, both threads could be provided with the profile disclosed herein.

What is claimed is:

1. In a worm gear having an outwardly directed thread on a spindle having first and second ends and a nut having a bore with an inwardly directed thread, said spindle being positioned inside said nut such that said outwardly directed and inwardly directed threads are intermeshed with both axial and radial play, the improvement wherein said spindle and nut have a first relative position in a state in which said first and second ends of said spindle are both subject to loading in a first radial direction with respect to the axis of the spindle and a second relative position different from said first relative position in a state in which said first and second ends of said spindle are subject to loading in opposite radial directions with respect to the axis of said spindle, thereby creating a torque, said spindle and nut having a relatively small axial play therebetween in said first state, said spindle having surface portions on said outwardly directed thread which transmit said torque between said spindle and nut, said torque transmitting surface portions being located only on a crown surface of said outwardly directed thread in respective thread areas in said second state, whereby said torque-transmitting portions of said crown surface of said outwardly directed thread are in contact with corresponding portions of a groove bottom arranged between said inwardly directed thread.

2. The worm gear as defined in claim 1, wherein one of said threads has a substantially trapezoidal profile.

3. The worm gear as defined in claim 1, wherein said outwardly directed thread has a predetermined thread pitch and a thread profile comprising a pair of rounded transition regions connecting a pair of thread flanks to said thread crown surface, said transition regions having a radius greater than one-quarter of said predetermined thread pitch.

4. The worm gear as defined in claim 1, wherein said thread crown surface is formed by a surface which is rounded in the axial direction.

5. The worm gear as defined in claim 1, wherein said outwardly directed thread has a predetermined thread pitch, and said thread crown surface is formed by a rounded surface which extends between said thread flanks with a radius equal to 0.2 to 0.5 times said predetermined thread pitch.

* * * * *